(12) United States Patent
Krych et al.

(10) Patent No.: US 11,485,440 B2
(45) Date of Patent: Nov. 1, 2022

(54) LUGGAGE RACK FOR SECURING AN ITEM OF LUGGAGE ON A MOTORCYCLE

(71) Applicant: Bayerische Motoren Werke Aktiengesellschaft, Munich (DE)

(72) Inventors: Tim Krych, Munich (DE); Martin Pazulla, Wolfratshausen (DE); Jan Rau, Feldkirchen-Westerham (DE); Andreas Riegl, Friedberg St Staetzling (DE); Johann Sievers-Paulsen, Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/285,704

(22) PCT Filed: Sep. 6, 2019

(86) PCT No.: PCT/EP2019/073832
§ 371 (c)(1),
(2) Date: Apr. 15, 2021

(87) PCT Pub. No.: WO2020/078619
PCT Pub. Date: Apr. 23, 2020

(65) Prior Publication Data
US 2022/0001948 A1  Jan. 6, 2022

(30) Foreign Application Priority Data

Oct. 16, 2018  (DE) .................... 10 2018 125 576.4

(51) Int. Cl.
*B62J 11/00* (2020.01)
(52) U.S. Cl.
CPC ................................. *B62J 11/00* (2013.01)

(58) Field of Classification Search
CPC ... B62J 7/04; B62J 9/23–24; B62J 9/27; B62J 11/00
(Continued)

(56) References Cited

U.S. PATENT DOCUMENTS 5,664,715 A    9/1997  Gogan et al.
2006/0138185 A1*  6/2006  Lien ........................... B62J 7/04
                                                                    224/427
(Continued)

FOREIGN PATENT DOCUMENTS

CN    1075285 A    8/1993
CN    1203164 A    12/1998
(Continued)

OTHER PUBLICATIONS

Chinese-language Office Action issued in Chinese Application No. 201980048390.0 dated Feb. 11, 2022 with English translation (11 pages).
(Continued)

*Primary Examiner* — Scott T McNurlen
(74) *Attorney, Agent, or Firm* — Crowell & Moring LLP

(57) ABSTRACT

A luggage rack for securing an item of luggage to a motorcycle or a scooter includes an adapter plate on which the item of luggage may be fastened. The adapter plate includes at least one positioning element configured to position the adapter plate relative to the motorcycle or motor scooter, and a displacement device having a lever and an engagement element which cooperate to secure or release the adapter plate from the motorcycle or motor scooter when the lever is moved between an open position and a closed position to cause the engagement element to slide into and out of engagement with a fixing point on the motorcycle or motor scooter.

14 Claims, 3 Drawing Sheets

(58) Field of Classification Search
USPC .................. 224/412–413, 419, 431
See application file for complete search history.

(56) References Cited

U.S. PATENT DOCUMENTS

| | | | | |
|---|---|---|---|---|
| 2008/0073396 | A1* | 3/2008 | Chiang | B62J 9/30 280/202 |
| 2012/0018475 | A1* | 1/2012 | Cooper | B60R 11/02 224/401 |
| 2012/0199620 | A1* | 8/2012 | Gold | B62K 21/12 224/413 |

FOREIGN PATENT DOCUMENTS

| | | | |
|---|---|---|---|
| CN | 1651301 A | 8/2005 | |
| DE | 10 2009 039 017 A1 | 3/2011 | |
| DE | 20 2013 101 143 U1 | 5/2013 | |
| DE | 299 21 906 U1 | 3/2020 | |
| EP | 1 473 216 A1 | 11/2004 | |
| EP | 1 634 801 A2 | 3/2006 | |
| EP | 2 402 237 A1 | 1/2012 | |
| EP | 3241727 A1 * | 11/2017 | ........... B62J 7/02 |
| EP | 3351466 A1 * | 7/2018 | ........... B62J 7/04 |
| JP | 2004268670 A * | 9/2004 | |
| KR | 20-0432642 Y1 | 12/2006 | |
| WO | WO 2004/076269 A1 | 9/2004 | |

OTHER PUBLICATIONS

Chinese-language Office Action issued in Chinese Application No. 201980048390.0 dated Sep. 3, 2021 with English translation (18 pages).
International Search Report (PCT/ISA/210) issued in PCT Application No. PCT/EP2019/073832 dated Nov. 21, 2019 with English translation (six (6) pages).
German-language Written Opinion (PCT/ISA/237) issued in PCT Application No. PCT/EP2019/073832 dated Nov. 21, 2019 (seven (7) pages).
German-language Search Report issued in German Application No. 10 2018 125 576.4 dated Jul. 1, 2019 with partial English translation (13 pages).

* cited by examiner

LUGGAGE RACK FOR SECURING AN ITEM OF LUGGAGE ON A MOTORCYCLE

BACKGROUND AND SUMMARY OF THE INVENTION

The invention relates to a luggage rack for securing a motorcycle luggage item for a motorcycle, motorized bicycle or a motor scooter.

In the prior art, luggage racks for receiving a motorcycle luggage item are screwed on the motorcycles or motor scooters and are fixed firmly on the vehicle.

It is a disadvantage of this, however, that the luggage rack, if it is not required, has to be removed with an additional tool which does not correspond to the on-board tool kit of the motorcycle or the motor scooter. This circumstance firstly makes the removal of the luggage rack very time-consuming, and secondly the rider has to carry the additional tool with himself/herself, in order for it to be possible for the luggage rack to be removed.

It is therefore an object of the present invention to provide a luggage rack which ensures simple and rapid mounting/removal, without it being necessary for an additional tool to be used in addition to the on-board toolkit.

Therefore, according to the invention, a luggage rack for securing a motorcycle luggage item for a motorcycle or a motor scooter is proposed with an adapter plate, on which the motorcycle luggage item can be fastened and which has at least one positioning element for specifying the position and pre-fixing of the luggage rack on the motorcycle or motor scooter. Furthermore, the luggage rack comprises a displacement apparatus which has an engagement element and a lever which interacts with the engagement element. Here, it is possible for the lever to be adjusted between an open position and a closed position, and in the process it moves the engagement element between a position, in which it is released from the motorcycle or the motor scooter, and a position, in which it is fastened to the motorcycle or the motor scooter.

Here, the positioning element facilitates the mounting of the luggage rack, since the user merely has to attach it by way of the positioning element at the contact point which is provided for this purpose on the motorcycle. By way of the positioning element, the luggage rack is guided precisely into the final mounting position during the further mounting. Furthermore, it is favorable that the luggage rack can be fixed on the motorcycle or motor scooter by means of the displacement apparatus. Flipping of the lever from the open position to the closed position displaces the engagement element to the fastening position, in which the engagement element engages on a counterpart in such a way that, together with the positioning element, it fixes the luggage rack firmly on the motorcycle or motor scooter. If the lever is reset again into the open position, the luggage rack is released again from the motorcycle or motor scooter. In this way, the luggage rack can be mounted and removed rapidly and without an additional tool.

It is provided in one advantageous embodiment that the adapter plate has at least one latching means which is arranged spaced apart from the positioning element in a longitudinal direction which corresponds to a riding direction or the main riding direction in the case of the proper use of the luggage rack. Furthermore, the at least one latching means is configured to latch releasably for pre-fixing purposes to a corresponding receptacle which is arranged on the motorcycle or motor scooter. As a consequence, the mounting is simplified considerably, since the luggage rack is already in its final mounting position by means of the pre-fixing and can be released therefrom only by way of a high application of force. Therefore, the luggage rack is not released from its final mounting position during the flipping of the lever, and can be fixed simply on the motorcycle or motor scooter.

The luggage rack is preferably configured in such a way that the positioning element projects from the adapter plate as a positioning hook which, at its free end, has a hook part. Said hook part is configured to engage behind a first fixing point on the motorcycle, which first fixing point is configured to receive the hook part, and therefore to ensure the specifying of the position and pre-fixing. It is favorable here that the hook part provides an optimum possibility of guiding the luggage rack into the final mounting position on account of the special form, and at the same time of fastening it securely to the first fixing point, since the hook shape counteracts slipping off from the contact point of the motorcycle or the motor scooter or virtually rules out slipping off.

It is provided in one advantageous exemplary embodiment of the invention that the positioning element and the at least one latching means are configured in one piece on the adapter plate. As a result, the number of components of the maintenance flap and therefore also the mounting complexity are minimized. Furthermore, this benefits the component strength in the case of loads which occur, and minimizes the play of the maintenance flap in the mounted state.

Furthermore, one embodiment is favorable, in the case of which the adapter plate has an adapter cutout for receiving the displacement apparatus in an at least partially integrated manner. Said adapter cutout makes it possible to integrate the displacement apparatus into the adapter plate, and utilizes the installation space and the room for the fastening apparatus on the motorcycle or motor scooter in an optimum manner.

According to the invention, it is provided in a further advantageous variant that the lever acts on the engagement element directly or indirectly via a coupling element for the movement of the engagement element.

In one design variant, the luggage rack according to the invention is configured such that the engagement element comprises at least two engagement webs which are spaced apart from one another in a transverse direction which is orthogonal with respect to the longitudinal direction, which engagement webs engage behind a second fixing point on the motorcycle or motor scooter in order to fix the luggage rack in the closed position of the lever. The two engagement webs are a reliable, space-saving and simple method of fastening the luggage rack to the second fixing point. Said engagement webs are adapted to the geometry of the second fixing point, and bear directly against the second fixing point in the final mounting position.

Furthermore, it is advantageous if the luggage rack comprises a fixing plate which is placed onto the adapter plate for receiving the motorcycle luggage item in a fixed manner, which fixing plate is fastened to the adapter plate via fastening means. The fastening of the motorcycle luggage item is improved further by means of the fixing plate. The fixing plate can be adapted precisely to the requirement of the fixing of the motorcycle luggage item, without it being necessary for components to be taken into consideration such as the displacement apparatus for fixing the luggage rack on the motorcycle or motor scooter.

Furthermore, it is provided in one development of the present invention that the fastening means comprise in each case elastic decoupling elements for damping a force or a vibration which is transmitted from the adapter plate to the fixing plate, which decoupling elements bear directly against the fixing plate in the mounted state. As a consequence, shaking during the ride with the motorcycle or motor scooter or other forces or vibrations which act from the outside on the motorcycle luggage item are reduced by means of the elastic decoupling elements. This benefits the retention of the luggage rack on the motorcycle or motor scooter and/or of the motorcycle luggage item on the luggage rack, and, furthermore, reduces the occurrence of component damage. Furthermore, it is particularly advantageous that the wobbling tendency of the motorcycle at high speeds is reduced by the decoupled receptacle.

In one preferred embodiment of the invention, a sliding plate is arranged between the adapter plate and the engagement element, along which sliding plate the engagement element slides in the case of a positional change of the lever between the open position and the closed position. The sliding plate prevents the displacement apparatus from sliding directly along the adapter plate and, as a result, prevents possible component damage. Furthermore, the sliding plate provides optimum frictional properties, as a result of which the sliding of the displacement apparatus is benefited.

It is provided in a further preferred design variant that, if the lever is situated outside the closed position, the lever projects beyond the adapter plate in a vertical direction which is orthogonal with respect to the longitudinal and transverse direction, and blocks mounting of the motorcycle luggage item on the adapter plate.

The luggage rack is preferably configured in such a way that, if the lever is situated outside the closed position, the lever projects in the vertical direction beyond the fixing plate and blocks mounting of the motorcycle luggage item on the fixing plate.

It is favorable here that it is prevented that the rider of the motorcycle or motor scooter rides off and the motorcycle luggage item is not fastened correctly to the luggage rack. This rules out a loss of a motorcycle luggage piece on account of faulty mounting of the luggage rack.

Other advantageous developments of the invention are identified in the subclaims and/or will be shown in greater detail in the following text together with the description of the preferred embodiment of the invention on the basis of the figures.

DETAILED DESCRIPTION OF THE DRAWINGS

Figure 1:
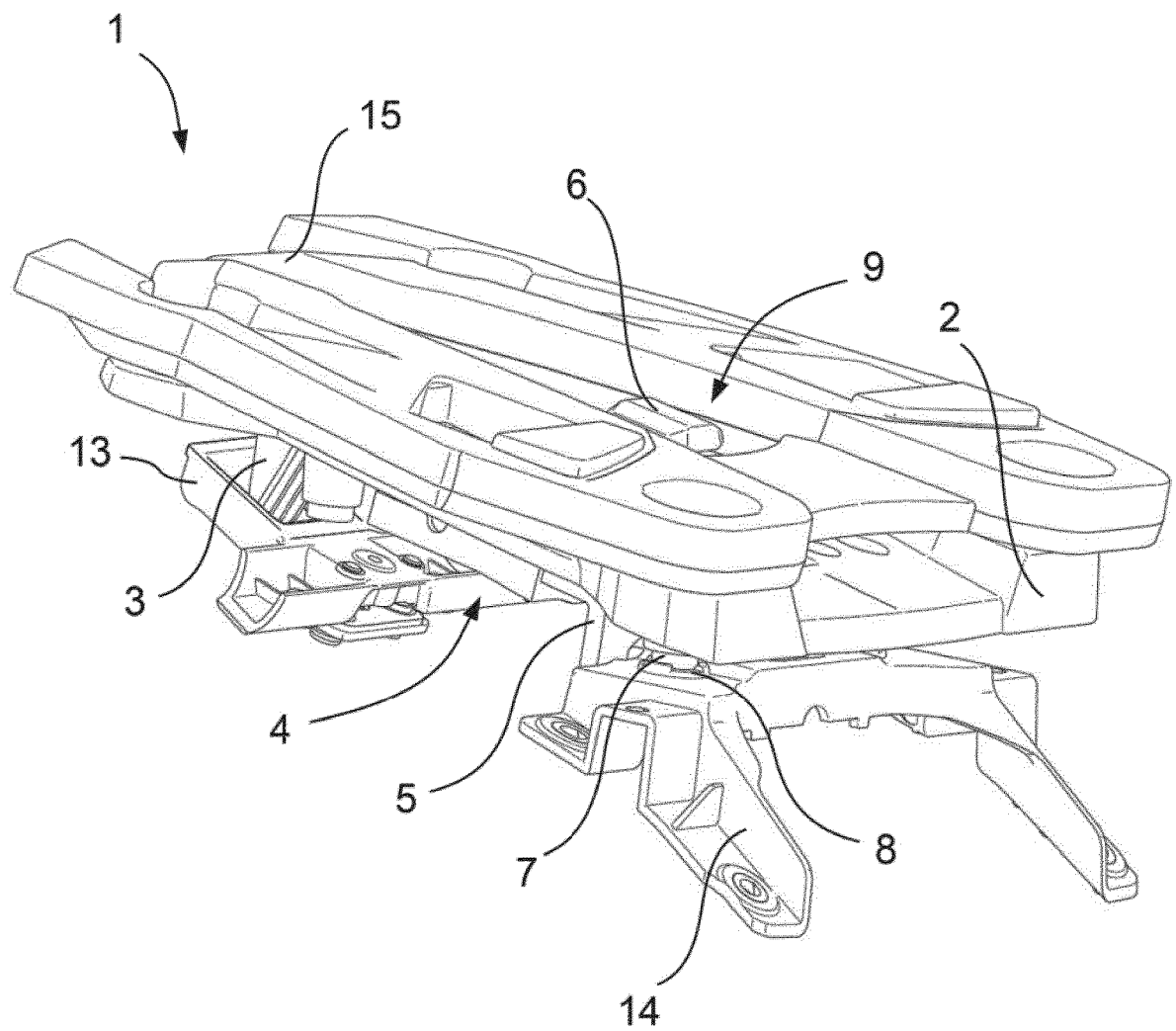
FIG. 1 shows a perspective top view of a luggage rack in accordance with an embodiment of the present invention.

FIG. 1 shows a perspective view of a luggage rack 1 for securing a motorcycle luggage item for a motorcycle or a motor scooter. The luggage rack 1 comprises an adapter plate 2, on which the motorcycle luggage item can be fastened. A positioning element 3 for specifying the position and pre-fixing of the luggage rack 1 at a first fixing point 13 of the motorcycle or motor scooter is configured on the adapter plate 2. Furthermore, the adapter plate 2 has two latching means 7 which are arranged spaced apart from the positioning element 3 in a longitudinal direction which corresponds to a riding direction in proper use of the luggage rack 1, and are configured for pre-fixing at a second fixing point 14. The two latching means 7 are latched releasably to corresponding receptacles 8 which are arranged at the second fixing point 14. Moreover, the positioning element 3 and the two latching means 7 are configured in one piece on the adapter plate 2.

Figure 2:
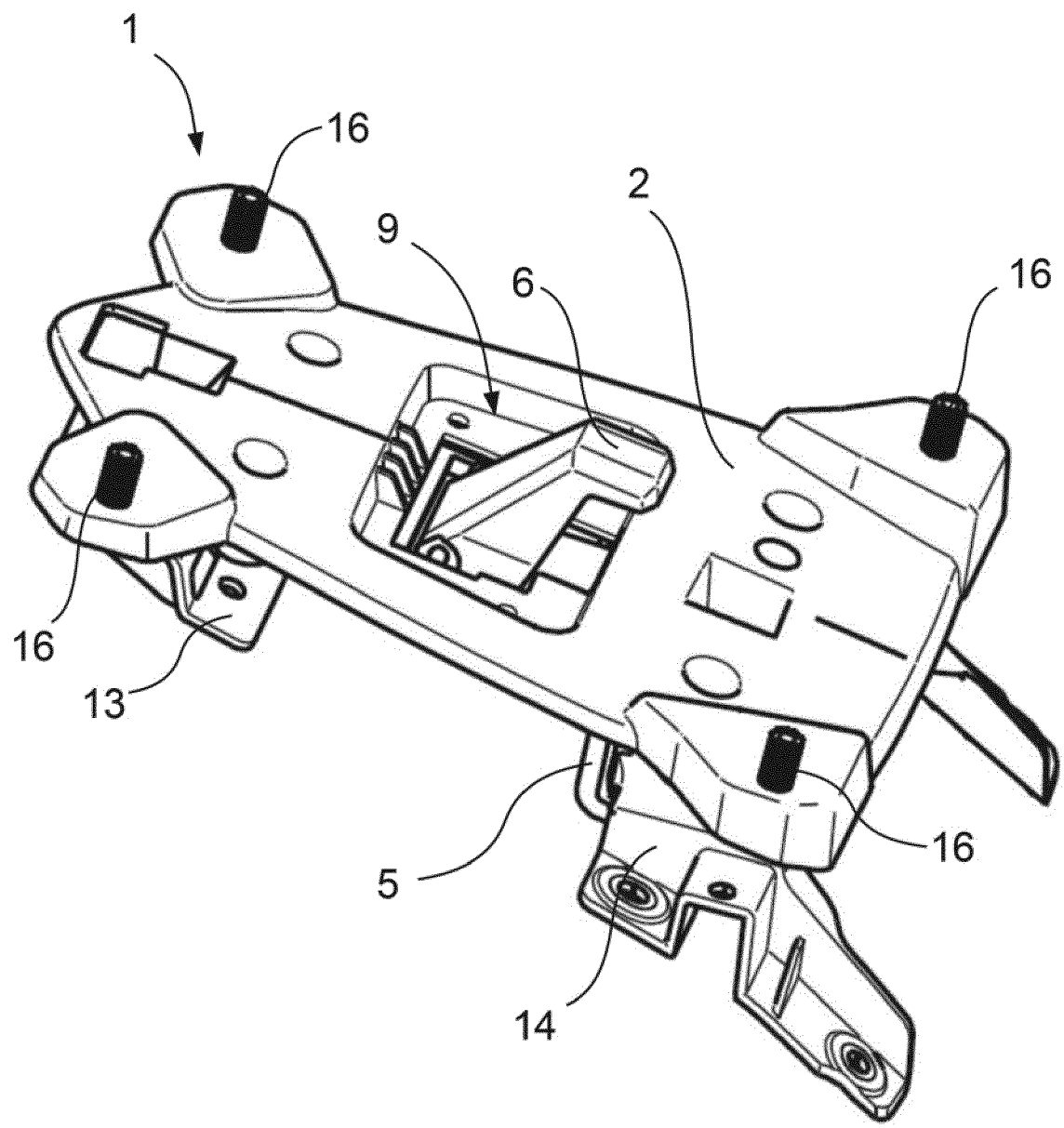
FIG. 2 shows a perspective top view of the FIG. 1 luggage rack with a removed fixing plate.

Furthermore, FIG. 1 or FIG. 2 shows that the adapter plate 2 has an adapter cutout 9 for receiving a displacement apparatus 4 in a partially integrated manner. The displacement apparatus 4 has an engagement element 5 and a lever 6 which interacts with the engagement element 5. The lever 6 can be adjusted between an open position and a closed position, and is situated in the closed position. The engagement element 5 is situated in a fastened position on the motorcycle or the motor scooter. The luggage rack 1 which is shown comprises a fixing plate 15 which is placed onto the adapter plate 2 in order to receive the motorcycle luggage item in a fixed manner.

FIG. 2 shows a perspective view of the luggage rack 1 from FIG. 1 with a removed fixing plate. Four fastening means 16 for fixing a fixing plate are provided on the adapter plate 2. The fastening means 16 in each case comprise elastic decoupling elements for damping a force or vibration which is transmitted from the adapter plate 2 to the fixing plate 15. In a mounted state, the elastic decoupling elements bear directly against the fixing plate.

Figure 3:
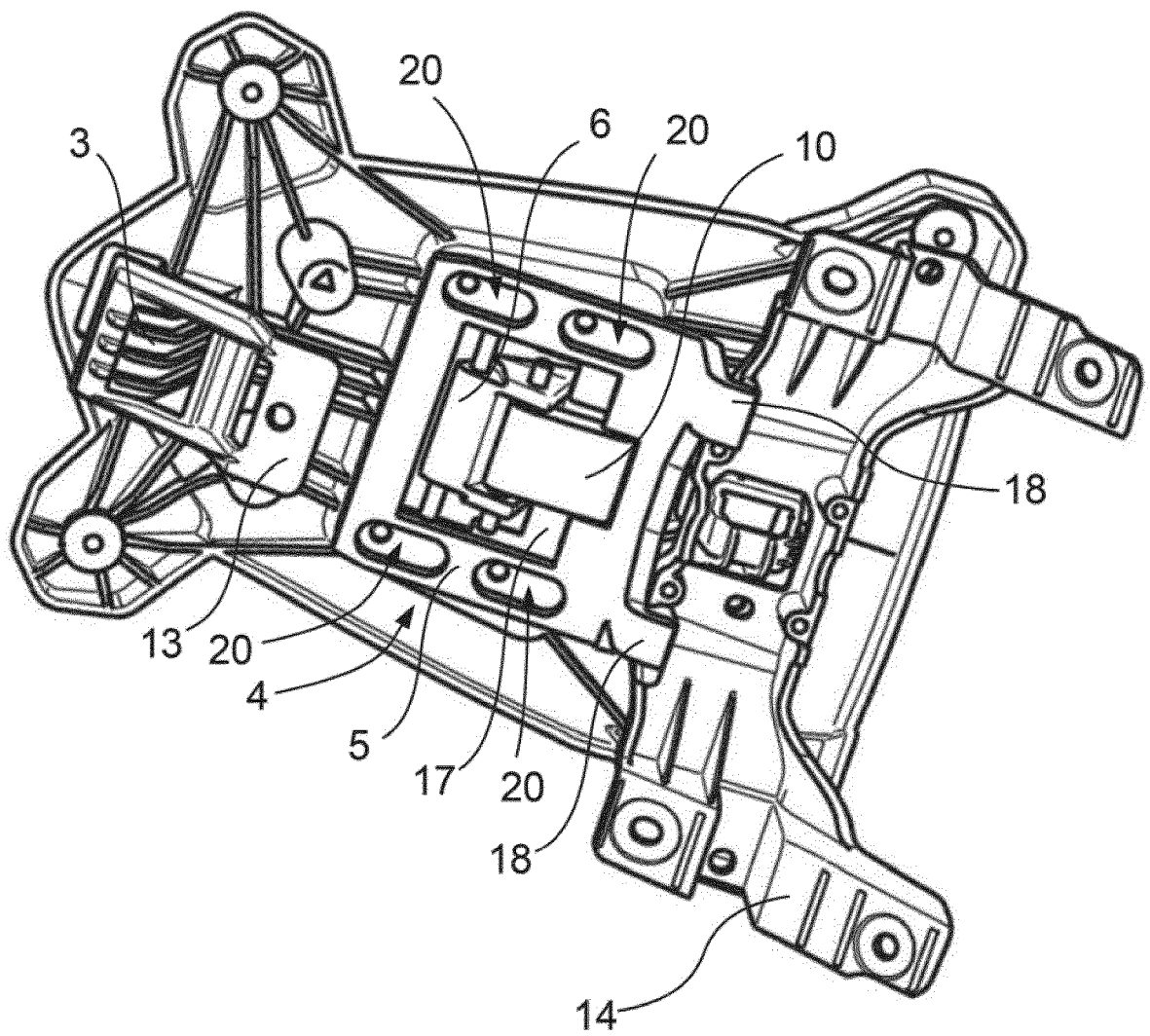
FIG. 3 shows a perspective view from below of the FIG. 1 luggage rack.

FIG. 3 shows a perspective view from below of a luggage rack 1. The positioning element 3 projects from the adapter plate 2 as a positioning hook and, at its free end, has a hook part. The positioning element 3 engages behind the first fixing point 13 on the motorcycle or motor scooter, and therefore ensures the specifying of the position and pre-fixing. The lever 6 of the displacement apparatus 4 for moving the engagement element 5 is connected indirectly via a coupling element 10 to the engagement element 5. For this purpose, in each case one pin which is arranged in a transverse direction which is orthogonal with respect to the longitudinal direction is provided between the lever 6 and the coupling element 10 and between the coupling element 10 and the engagement element 5. A third pin mounts the lever 6 on the displacement apparatus 4 and/or the adapter plate 2. The engagement element 5 comprises two engagement webs 18 which are arranged spaced apart from one another in the transverse direction and engage behind the second fixing point 14 on the motorcycle or motor scooter in order to fix the luggage rack 1, since the lever 6 is situated in the closed position. Furthermore, a sliding plate 17 is arranged between the adapter plate 2 and the engagement element 5. In the case of a positional change of the lever 6 between the open position and the closed position, the engagement element 5 slides along the sliding plate 17. For the movable mounting of the engagement element 5 and the displacement apparatus 4, four cutouts (20) are provided on the engagement element 5, which cutouts (20) extend in the longitudinal direction (riding direction). Via said cutouts (20), the engagement element 5 is fixed movably by means of fastening means. The longitudinal extent of the cutouts (20) makes sliding to and fro of the engagement element 5 in the longitudinal direction by means of the actuation of the lever 6 possible.

The invention is not restricted in terms of its implementation to the above-specified preferred exemplary embodiments. Rather, a number of variants are conceivable which make use of the solution which is shown, even in the case of embodiments of fundamentally different type.

What is claimed is:

1. A luggage rack for securing a motorcycle luggage item to a motorcycle or a motor scooter, comprising:
   an adapter plate configured to receive and hold the motorcycle luggage item;
   at least one positioning element projecting from the adapter plate, the at least one positioning element being configured to locate the adapter plate in a predetermined position relative to the motorcycle or motor scooter when the luggage rack is located on the motorcycle or motor scooter; and
   a displacement apparatus of the adapter plate having an engagement element and a lever, the lever being configured to cooperate with the engagement element to secure and release the adapter plate to the motorcycle or motor scooter when the luggage rack is located on the motorcycle or motor scooter,
   wherein
      the lever is movable between an open position in which the lever moves the engagement element to a position in which the adapter plate is not secured to the motorcycle or the motor scooter, and to a closed position in which the engagement element is secured to the motorcycle or the motor scooter, and
      if the lever is not in the closed position, the lever projects vertically above the adapter plate such that mounting of the motorcycle luggage item on the adapter plate is blocked.

2. The luggage rack according to claim 1, wherein
   the at least one positioning element projecting from the adapter plate is a positioning hook having a hook part at a free end engage a first fixing point on the motorcycle or motor scooter such that when the positioning element is in an engaged position with the first fixing point, the adapter plate is in the predetermined position.

3. The luggage rack according to claim 1, wherein
   the adapter plate includes at least one latching arrangement spaced apart from the adapter plate positioning element in a longitudinal direction, the at least one latching arrangement being configured to latch releasably with a corresponding receptacle arranged on the motorcycle or motor scooter when the adapter plate is located on the motorcycle or motor scooter.

4. The luggage rack according to claim 3, wherein
   the at least one positioning element projecting from the adapter plate is a positioning hook having a hook part at a free end engage a first fixing point on the motorcycle or motor scooter such that when the positioning element is in an engaged position with the first fixing point, the adapter plate is in the predetermined position.

5. The luggage rack according to claim 3, wherein
   the at least one positioning element and the at least one latching arrangement are each configured in one piece with the adapter plate.

6. The luggage rack according to claim 3, wherein
   the adapter plate includes an adapter cutout configured to accommodate the displacement apparatus at least partially in the adapter cutout.

7. The luggage rack according to claim 6, wherein
   the lever cooperates with a coupling element arranged between the lever and the engagement element to move the engagement element between the open and closed positions.

8. The luggage rack according to claim 7, wherein
   the engagement element includes at least two engagement webs spaced apart from one another in a transverse direction orthogonal to the longitudinal direction, and the engagement webs are configured to engage a second fixing point on the motorcycle or motor scooter when the adapter plate is located on the motorcycle or motor scooter and the lever is in the closed position.

9. The luggage rack according to claim 8, further comprising:
   a sliding plate arranged between the adapter plate and the engagement element, the sliding plate being configured to support sliding of the engagement element in the longitudinal direction when the lever is moved between the open and closed positions.

10. The luggage rack according to claim 3, further comprising:
    a fixing plate,
    wherein the fixing plate is
       configured to be either or both of arranged on and secured to the adapter plate, and
       configured to receive and retain the motorcycle luggage item.

11. The luggage rack according to claim 3, wherein
    a fixing plate is configured to be secured to the adapter plate via fasteners.

12. The luggage rack according to claim 11, wherein
    the fasteners include elastic decoupling elements configured to damping a force or a vibration passing between the adapter plate and the fixing plate, and
    the elastic decoupling elements bear directly against the fixing plate when the fixing plate is secured to the adapter plate.

13. A luggage rack for securing a motorcycle luggage item to a motorcycle or a motor scooter, comprising:
    an adapter plate configured to receive and hold the motorcycle luggage item;
    at least one positioning element projecting from the adapter plate, the at least one positioning element being configured to locate the adapter plate in a predetermined position relative to the motorcycle or motor scooter when the luggage rack is located on the motorcycle or motor scooter; and
    a displacement apparatus of the adapter plate having an engagement element and a lever, the lever being configured to cooperate with the engagement element to secure and release the adapter plate to the motorcycle or motor scooter when the luggage rack is located on the motorcycle or motor scooter,
    wherein
       the lever is movable between an open position in which the lever moves the engagement element to a position in which the adapter plate is not secured to the motorcycle or the motor scooter, and to a closed position in which the engagement element is secured to the motorcycle or the motor scooter,
       the adapter plate includes at least one latching arrangement spaced apart from the adapter plate positioning element in a longitudinal direction, the at least one latching arrangement being configured to latch releasably with a corresponding receptacle arranged on the motorcycle or motor scooter when the adapter plate is located on the motorcycle or motor scooter,
       a fixing plate is configured to be secured to the adapter plate via fasteners,
       the fasteners include elastic decoupling elements configured to damping a force or a vibration passing between the adapter plate and the fixing plate, and
       the elastic decoupling elements bear directly against the fixing plate when the fixing plate is secured to the adapter plate, and if the lever is not in the closed position, the lever projects vertically above the fixing plate such that mounting of the motorcycle luggage item on the fixing plate is blocked.

14. A luggage rack for securing a motorcycle luggage item to a motorcycle or a motor scooter, comprising:
   an adapter plate configured to receive and hold the motorcycle luggage item;
   at least one positioning element projecting from the adapter plate, the at least one positioning element being configured to locate the adapter plate in a predetermined position relative to the motorcycle or motor scooter when the luggage rack is located on the motorcycle or motor scooter; and
   a displacement apparatus of the adapter plate having an engagement element and a lever, the lever being configured to cooperate with the engagement element to secure and release the adapter plate to the motorcycle or motor scooter when the luggage rack is located on the motorcycle or motor scooter,
   wherein
      the lever is movable between an open position in which the lever moves the engagement element to a position in which the adapter plate is not secured to the motorcycle or the motor scooter, and to a closed position in which the engagement element is secured to the motorcycle or the motor scooter,
      the adapter plate includes at least one latching arrangement spaced apart from the adapter plate positioning element in a longitudinal direction, the at least one latching arrangement being configured to latch releasably with a corresponding receptacle arranged on the motorcycle or motor scooter when the adapter plate is located on the motorcycle or motor scooter,
      the adapter plate includes an adapter cutout configured to accommodate the displacement apparatus at least partially in the adapter cutout,
      the lever cooperates with a coupling element arranged between the lever and the engagement element to move the engagement element between the open and closed positions,
      the engagement element includes at least two engagement webs spaced apart from one another in a transverse direction orthogonal to the longitudinal direction, and
      the engagement webs are configured to engage a second fixing point on the motorcycle or motor scooter when the adapter plate is located on the motorcycle or motor scooter and the lever is in the closed position, and
      if the lever is not in the closed position, the lever projects vertically above a fixing plate such that mounting of the motorcycle luggage item on the fixing plate is blocked.

* * * * *